United States Patent
Fong (12)

(10) Patent No.: US 6,292,879 B1
(45) Date of Patent: Sep. 18, 2001

(54) METHOD AND APPARATUS TO SPECIFY ACCESS CONTROL LIST AND CACHE ENABLING AND CACHE COHERENCY REQUIREMENT ENABLING ON INDIVIDUAL OPERANDS OF AN INSTRUCTION OF A COMPUTER

(76) Inventor: Anthony S. Fong, 5B Block 13, Tak Chee Yuen, 88 Tat Chee Ave., Kowloon (HK)

( * ) Notice: Subject to any disclaimer, the term of this patent is extended or adjusted under 35 U.S.C. 154(b) by 0 days.

(21) Appl. No.: 08/736,326

(22) Filed: Oct. 23, 1996

Related U.S. Application Data

(60) Provisional application No. 60/007,066, filed on Oct. 25, 1995.

(51) Int. Cl.$^7$ ...................................................... G06F 12/00
(52) U.S. Cl. ................................ 711/214; 711/3; 711/141; 711/200
(58) Field of Search ............................. 711/3, 100, 200, 711/211, 272, 213, 214, 212, 141, 273

(56) References Cited

U.S. PATENT DOCUMENTS

| | | | |
|---|---|---|---|
| 4,068,299 | * | 1/1978 | Bachman .............................. 711/202 |
| 4,236,206 | * | 11/1980 | Strecker et al. ...................... 395/380 |
| 4,447,879 | | 5/1984 | Fong . |
| 4,731,734 | * | 3/1988 | Gruner et al. ........................ 711/202 |
| 4,894,772 | * | 1/1990 | Langedorf ............................. 395/587 |
| 4,926,323 | * | 5/1990 | Baror et al. ........................... 395/585 |
| 4,942,520 | * | 7/1990 | Langendorf ........................... 711/140 |
| 5,075,842 | | 12/1991 | Lai . |
| 5,412,786 | * | 5/1995 | Kusano ................................. 395/375 |
| 5,450,563 | * | 9/1995 | Gregor ...................................... 711/3 |
| 5,463,746 | * | 10/1995 | Brodnax et al. ..................... 395/375 |
| 5,553,258 | | 9/1996 | Godiwala et al. . |

* cited by examiner

*Primary Examiner*—Tuan V. Thai
(74) *Attorney, Agent, or Firm*—Stephen J. LeBlanc; Law Offices of Jonanthan Alan Quine

(57) ABSTRACT

A computer has its programs in instructions and operand descriptors to specify the operands of the instructions. Apparatus for identifying data coherency and encaching requirements and providing access control in a computer system with operands of its instructions specified by operand descriptors is described hereby. In a computer system wherein data items (operands) are represented by operand descriptors that can comprise object numbers, addresses, data types and sizes, vector information and other relevant information concerning the operands, with one bit to identify if the data coherency is to be maintained, another bit to identify if the data is cached, and a field to provide information on the privilege of Read, Write and Execute, and Supervisor or User mode. When an operand is accessed, the respective access control code is checked to validate if any protection is violated, whether caching is activated and whether it is required to maintain data coherency.

19 Claims, 5 Drawing Sheets

| Address 48 | Type 4 | Size 8 | Vector 8 | Access 4 | Data coherency 1 | Caching 1 |
|---|---|---|---|---|---|---|
| 0 | 47 48 51 | 52  59 | 60  67 | 68  71 | 72 | 73 |

```
field name       # bits encoding    definition
Address            48                 virtual address Type               4     0            undefined
                         1            logical and integer
                         2            floating-point
                         3            binary-coded-decimal
                         4            character string
                         5            bit string
                         6-F          undefined Size
      size_type    1     0            size_count is number of bytes or bits
                         1            size_count is number of pages (64 Kbyte page)
      size_count   7                  number of bytes for all types except bit
strings, or
                                      number of bits for bit strings
                                      number of pages Vector info         8                 "Size" (8-bit field) is the size of an
element in the
                                      vector.
                                      "Address" (48-bit field) is the virtual
address of the
                                      first element of the remaining elements.
                                      count of the remaining elements Access control      4     0           no access privilege
           [0]            0           access for both supervisor and user modes
                          1           access for supervisor mode only
           [1]            0           no read privilege
                          1           read privilege
           [2]            0           no write privilege
                          1           write privilege
           [3]            0           no execute privilege
                          1           execute privilege Data coherency      1     0           no data coherency maintenance required
                          1           data coherency maintenance required Caching             1     0           no data caching required
                          1           data caching required
```

OPERAND DESCRIPTOR

| OPCODE 16 | OD0 16 | OD1 16 | OD2 16 |
|---|---|---|---|
| 0 | 16 | 32 | 48 | 63 |

| field name | # bits | definition |
|---|---|---|
| opcode | | |
| [0:12] | 12 | Instruction operation code |
| [13] | 1 | To indicate OD0 to be a simple 64-bit data |
| [14] | 1 | To indicate OD1 to be a simple 64-bit data |
| [15] | 1 | To indicate OD2 to be a simple 64-bit data |
| | | |
| OD0 | 16 | If OD0 < 64, use general registers (implementation dependency) |
| OD1 | 16 | If OD1 < 64, use general registers (implementation dependency) |
| OD2 | 16 | If OD2 < 64, use general registers (implementation dependency) |

*FIGURE 1: INSTRUCTION FORMATS*

| Data 64 | Type 4 | Access 4 | Data coherency 1 | Caching 1 |
|---|---|---|---|---|
| 0 | 63 64 67 | 68 71 | 72 | 73 |

*FIGURE 2: GENERAL REGISTER*

| Address | Type | Size | Vector | Access | Data coherency | Caching |
|---------|------|------|--------|--------|----------------|---------|
| 48 | 4 | 8 | 8 | 4 | 1 | 1 |

0             47 48 51 52     59 60     67 68     71 72        73

| field name | # bits | encoding | definition |
|------------|--------|----------|------------|
| Address | 48 | | virtual address |
| Type | 4 | 0 | undefined |
| | | 1 | logical and integer |
| | | 2 | floating-point |
| | | 3 | binary-coded-decimal |
| | | 4 | character string |
| | | 5 | bit string |
| | | 6-F | undefined |
| Size | | | |
| size_type | 1 | 0 | size_count is number of bytes or bits |
| | | 1 | size_count is number of pages (64 Kbyte page) |
| size_count | 7 | | number of bytes for all types except bit strings, or |
| | | | number of bits for bit strings |
| | | | number of pages |
| Vector info element in the address of the | 8 | | "Size" (8-bit field) is the size of an vector. |
| | | | "Address" (48-bit field) is the virtual first element of the remaining elements. |
| | | | count of the remaining elements |
| Access control | 4 | 0 | no access privilege |
| [0] | | 0 | access for both supervisor and user modes |
| | | 1 | access for supervisor mode only |
| [1] | | 0 | no read privilege |
| | | 1 | read privilege |
| [2] | | 0 | no write privilege |
| | | 1 | write privilege |
| [3] | | 0 | no execute privilege |
| | | 1 | execute privilege |
| Data coherency | 1 | 0 | no data coherency maintenance required |
| | | 1 | data coherency maintenance required |
| Caching | 1 | 0 | no data caching required |
| | | 1 | data caching required |

FIGURE 3: OPERAND DESCRIPTOR

METHOD AND APPARATUS TO SPECIFY ACCESS CONTROL LIST AND CACHE ENABLING AND CACHE COHERENCY REQUIREMENT ENABLING ON INDIVIDUAL OPERANDS OF AN INSTRUCTION OF A COMPUTER

CROSS REFERENCE TO RELATED APPLICATIONS

This application claims the benefit of the filing date of Provisional Application No. 60/007,066, filed Oct. 25, 1995.

BACKGROUND OF THE INVENTION

1. Field of the Invention

The present invention is related to digital processing systems, more specifically, concerning identifying data coherency requirement and data caching requirement, with a piece of data residing in one or more different storage elements in a digital data processing system, providing access control code of a piece of data which relates more particularly to digital data processing systems with multiprogramming, and a mixed static and dynamic branch prediction method with correct static branch predictions on both in-loop (during looping) and loop-exit (exit from loops) branch predictions.

2. Description of the Prior Art

A digital data processing system (computer) instruction is composed of an opcode and one or more operands. The operands are data in either registers or memory. There are no qualifiers that explicitly specify the nature and system attributes for the data except those implied by the opcode. In a descriptor architecture computer, the operands in an instruction are specified by descriptors. A descriptor of an operand usually consists of a virtual address of the memory space of the operand, its data type and size, and vector specification if so exists.

To optimize the memory reference performance, operating systems specify if a page of data should be encached or not, so that unnecessary and undesirable data encaching will be avoided. It is also desirable to be able to specify if maintaining data coherency in a multiprocessing system is required. Such maintenance demands exhaustive checking, which creates performance bottlenecks and system complexity, but only a small percentage of data requires absolute data coherency. To provide protection to data, access code is often utilized to limit read, write and sometimes execution accesses to authorized and privile,ed processes.

At present, to specify a piece of data in a digital data processing system the system attributes such as encaching or maintaining data coherency, and access control of the piece of data, is on page basis through Translation Lookaside Buffer (TLB) via page table entries in page tables managed by memory management of operating systems. The data coherency is normally assumed to be required in a computer system. The access control on data is normally on per page basis and is implemented in the Translation Lookaside Buffer (TLB) via page tables managed by memory management of operating systems.

At present, in descriptor architecture computers, just like in others, system attributes such as access control on data, caching options to specify if a page of data should be encached or not, and ability to specify if maintaining absolute data coherency in a multiprocessing system is required, are on per page basis and not on individual operands.

The present computers contain branch prediction logic to predict with high accuracy if branching will take place for a conditional branch instruction or not. It is done so with static and dynamic branch prediction schemes. Static methods are based on compilers to generate object codes to identify to the processor if branching is likely or unlikely to occur. Dynantic methods are based on hardware to store histogram of earlier branching and not branching actions, and make an educated guess that branching will be talcen or not, for the current conditional branch instruction.

The present invention is an improvement over certain previous computer systems. An instruction consists of an opcode, and indexes of operand descriptors pointing to operand descriptors as a descriptor computer, and a branch prediction scheme.

SUMMARY OF THE INVENTION

The invention disclosed herein concerns features that add to the existing processors, described in the previous section of "Description of the Prior Art". These features are parts of the computer system HISC: A High-level Instruction Set Computer.

The first feature is the indicator or data coherency flag residing in the operand descriptor that indicates if it is required to maintain the coherency of the data when the data is stored in various storage elements or caches in a processing system. The requirement will typically be accomplished by a method checking the existing data of the address in other storage elements in the processing system, which typically are caches, and buffers. The benefit of this invention is to eliminate the need of such checking for the operands that are specified to have no such need of maintaining absolute data coherency, to minimize the snooping necessary for data coherency. The decision on issuing such data coherency flag is accomplished trough programming languages and their corresponding compilers.

There is also an indicator or eneaching flag residing in the operand descriptor that indicates if the data is to be encached or not. Encaching means the data will also resides in cache, in order to expedite the accesses to the data. However, there are cases that this facility is not desirable, such as in those cases the references will be made only once for a long time. This feature is to avoid unnecessary or undesirable caching.

Another invention feature is the access control code in the operand descriptor which indicates the access privilege required in order to be able to perform certain access to the data, together with the required mode of the accessor. The access is defined as read, write and/or execute, and the mode is either supervisor and user. The supervisor mode dictates that only supervisor processes can access the data of the operand if other access code bits permit. A non-supervisor (or user) mode indicates that all processes can access the data provided that other access code bits permit.

The branch prediction of HISC is a mix of dynamic and static branch prediction method. The static part is done through the opcode assignment In HISC, an instruction consists of a 16-bit opcode, followed by three 16-bit operand descriptors, as shown in FIG. 1. Two bits in the opcode field are used to facilitate conditional branching. The first of the two bits is used to indicate if static conditional branch prediction or dynamic branch prediction is used. The second bit is for static branch prediction to indicate prediction of branching. The compiler will decide if the static or the dynamic branch prediction should be used, and in static branch prediction case, if it is likely or unlikely to branch. Inner loop counting will utilize the static prediction, and the opcode will indicate if it is likely to branch or not. For other conditional branching which will mainly be decision making, the dynamic branch prediction is used. In order to identify the last pass of a loop counting, the Branch Prediction Unit (BPU) of HISC contains a fully-associative array, a loop-exit look-up table, of addresses of static prediction branch instructions of loop counting. There is a special loop-counting instruction in HISC. BPU will put the current branch instruction address into the associative array when it detects the loop-counting instruction and it is executing the second last pass. If BPU encounters a hit in the loop-exit look-up table, it will predict the opposite of the static prediction scheme, since this is the very last pass of the loop. If the addresses overflow the look-up table capacity, the incorrect prediction only impacts the performance. If there is any entry in the array is replaced undesirably, the processor still maintains its system integrity.

BRIEF DESCRIPTION OF THE DRAWINGS

FIG. 1 is a diagram of the instruction format of the present invention;

FIG. 2 is a diagram of the general register format of the present invention;

FIG. 3 is a diagram of the operand descriptor format of the present invention.

DESCRIPTION OF A PREFERRED EMBODIMENT

The following description presents the structure and operation of a computer system incorporating a presently preferred embodiment of the present invention. HISC is a descriptor architecture computer. An instruction consists of an opcode, an index of the destination operand descriptor, and two indexes of the source operand descriptors, as shown in FIG. 1. For example, to execute an ADD instruction, the two pieces of data pointed by the two source operand descriptors are added together, and the result is stored in the storage pointed by the destination operand descriptor.

A descriptor of an operand usually consists of a virtual address of the memory space of the operand, its data type and size, and vector specification if so exists. HISC extends the operand descriptor to include system attributes: to allow enabling of cache for the data of the operand, to specify if data coherency is to be maintained, and to specify access control code for the data of the operand, as shown in FIG. 3. For performance purpose, any operand descriptor index less than 64 will refer directly to the corresponding general register, shown in FIG. 2. HISC also employs a mix of static and dynamic branch prediction method, with a hardware mechanism to correctly predict the end of a loop counting.

A. Access Control

When a program is compiled, the object code consists of three parts: the instructions, a table of operand descriptors, and the data pointed by the operand descriptors. The operand descriptors are a linear array, indexed by the operand descriptor indexes in the instructions. When the object code is initially loaded into the HISC system, the operating system will compare the attributes specified for individual operands in the object code, with respective templates of the corresponding files to verify if access privileges are being violated. If so, the process will be terminated for protection violation.

There are four bits in the access code in an operand descriptor: supervisor mode, read privilege, write privilege, and execute privilege. The supervisor mode requires supervisor processes to access the data, coupled with the other privilege specifications. Read, write, and execute privileges are also specified to grant minimum access privileges necessary for the work the processes have to perform.

Before an instruction is allowed to execute, its operand descriptors must be loaded into a special fast storage with speed comparable to a data cache, which is named operand descriptor cache. When the program is being executed, any time a memory reference is made on an operand, the access code in the corresponding operand descriptor cache will be checked against the memory operation to verify if there is any violation in access privileges. If access is violated, a protection fault results, and the program will not be allowed to continue its execution.

Figure 4:
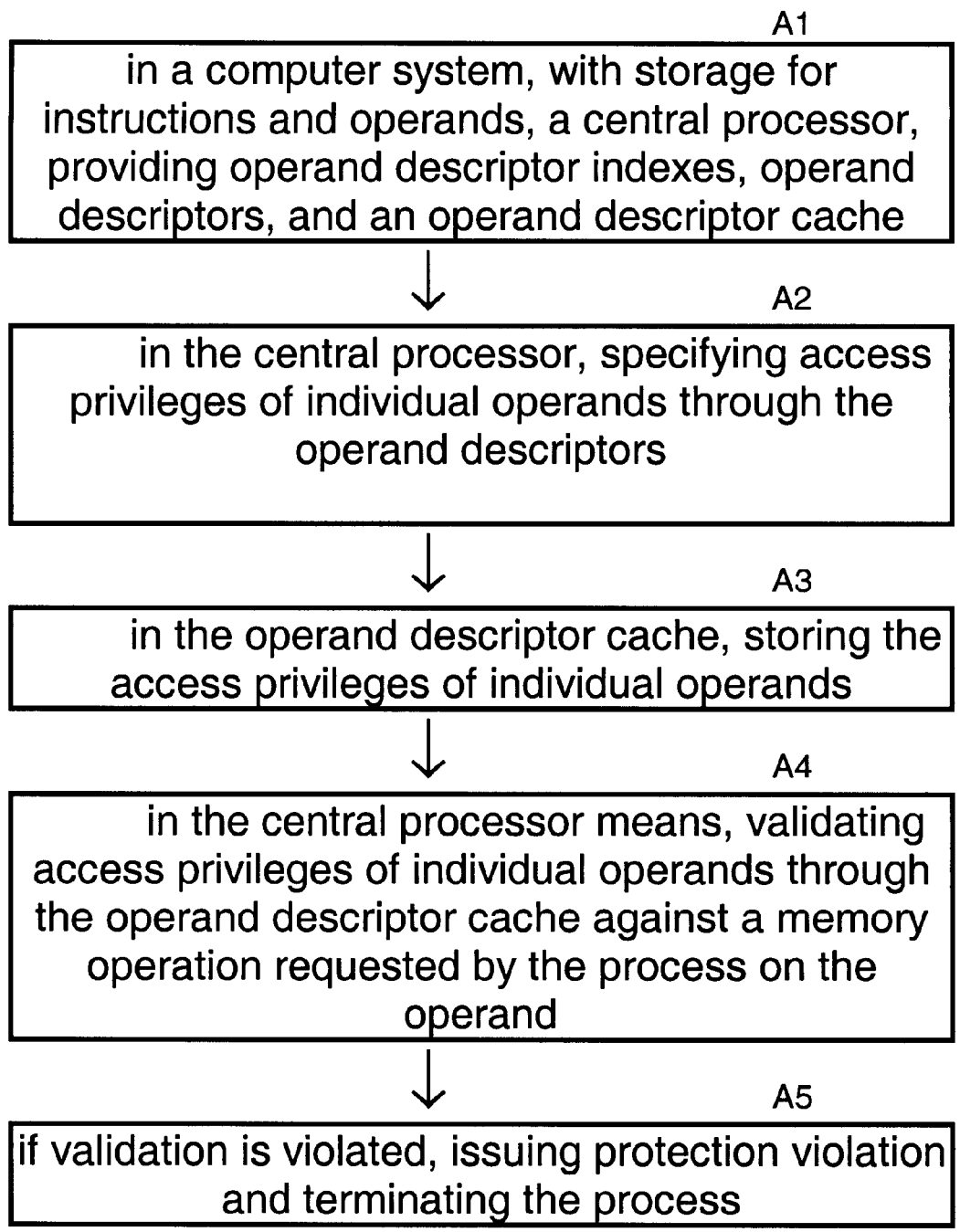
FIG. 4 is a diagram illustrating a method for specifying operand descriptors according to specific embodiments of the present invention.

FIG. 4 illustrates a method for checking operand data accesses using operand descriptors and terminating a process if access is violated.

Figure 5:
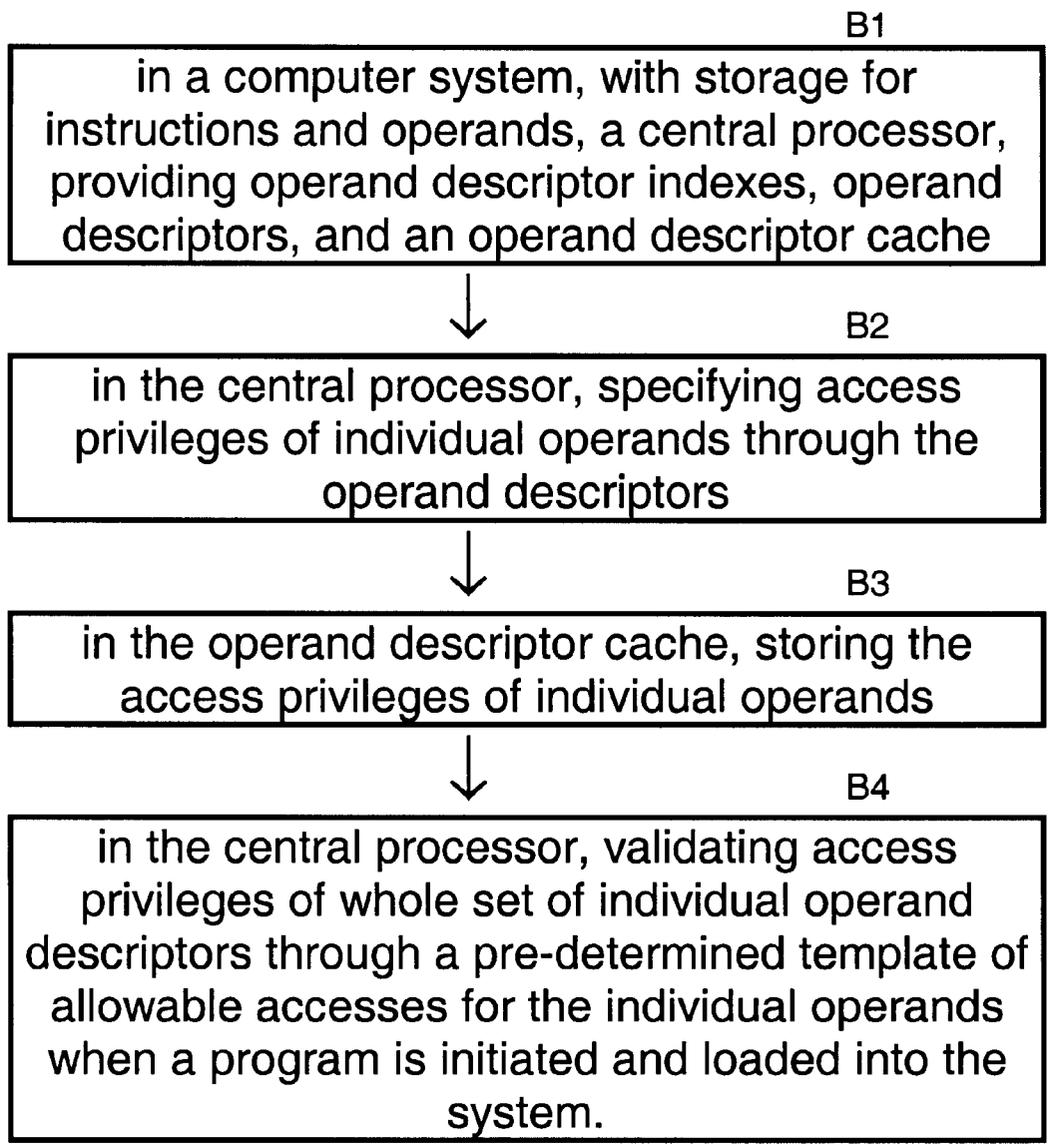
FIG. 5 is a diagram illustrating a method for specifying operand descriptors according to a first alternative embodiment of the present invention.

FIG. 5 illustrates a method for checking operand data accesses using operand descriptors using a predetermined template according to specific embodiments of the present invention.

B. Encaching Option and Data Coherency Option

The operand descriptor cache also contains encaching and maintenance of data coherency. Every time a reference is made, the data cache will honor these two 1-bit flags, and will or will not perform eneaching of the data and maintain data coherency according to the flags. The data cache will check with the corresponding entry of the operand descriptor cache for the action declared.

Because an entry in the operand descriptor cache dictates the action and access checking, and different programs may have different operand descriptors for a certain piece of data, different programs can have different settings for these cache features and access privileges. even though they share the identical piece of data in memory concurrently. Therefore different programs or users can be granted different privileges for the identical piece of data concurrently.

Figure 6:
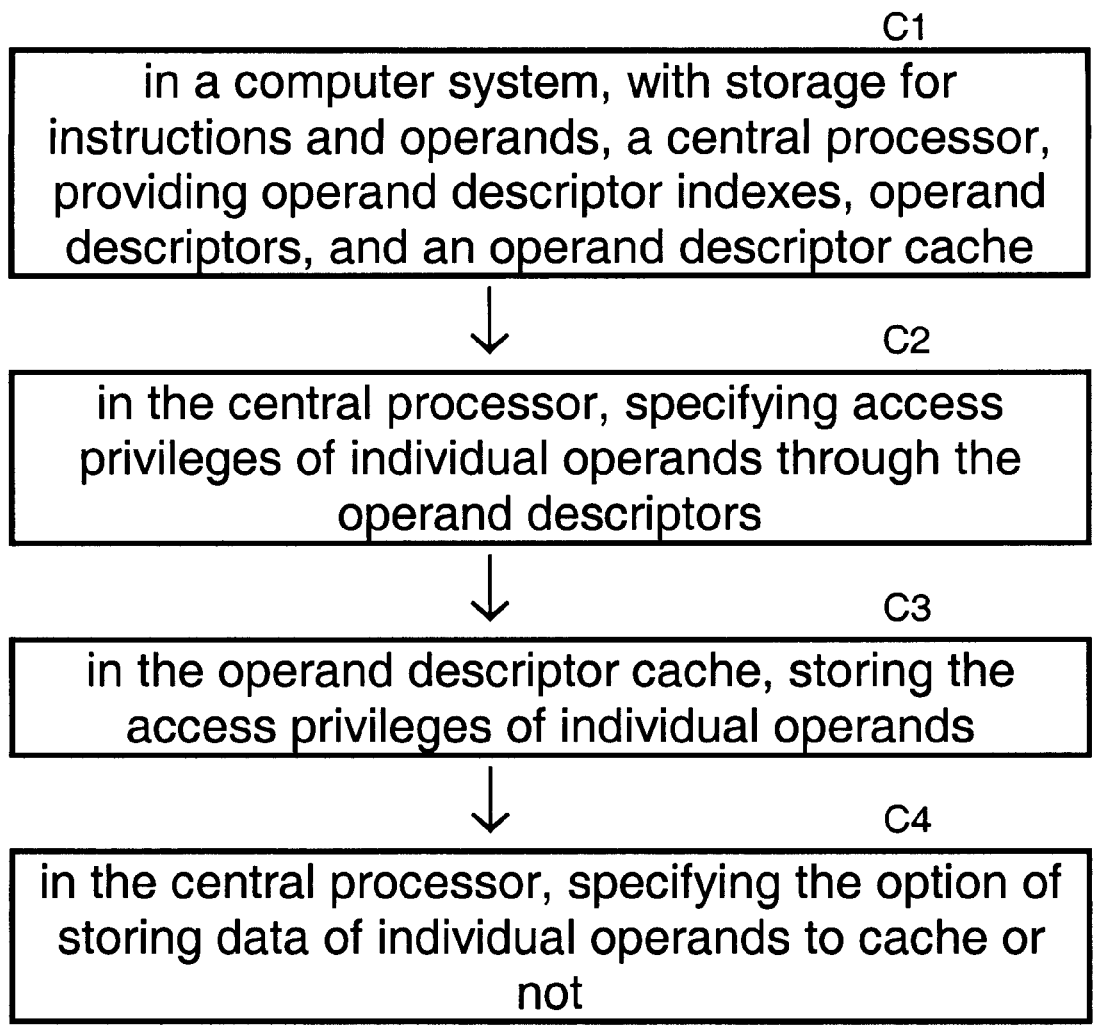
FIG. 6 is a diagram illustrating a method for specifying operand descriptors according to a second alternative embodiment of the present invention.

FIG. 6 illustrates a method for checking access of operands using operand descriptors and further including an indication of whether operand data should be cached according to specific embodiments of the present invention.

C. The Improved Branch Prediction

In many present computers, the operand sizes are of a fixed length, normally a word-length, depending if it is a 32-bit or a 64-bit architecture computer. In a program, information is often of variable lengths, such as a name or an address, and it often requires inner loops to process the piece of information. The HISC architecture allows variable length and long operands. Therefore it requires less inner loops than others. Loop counting is highly predictable, and the very last pass of a loop is important enough to warrant special handling.

The branch prediction of HISC is a mix of dynamic and static branch prediction method. The static part is done through the opcode assignment. In HISC, an instruction consists of a 16-bit opcode, followed by 16-bit operand descriptors, as shown in FIG. 1. Two bits in the opcode field are used to facilitate conditional branching. The first of the two bits is used to indicate if static conditional branch prediction or dynamic branch prediction is used. The second bit is for static branch prediction to indicate prediction of branch taken or not taken. The compiler will decide if the static or the dynamic branch prediction should be used, and in static branch prediction case, if it is likely or unlikely to branch. Inner loop counting will utilize the static prediction, and the opcode will indicate if it is likely to branch or not. For other conditional branching which will mainly be decision making, the dynamic branch prediction is used.

In order to identify the last pass of loop counting, the Branch Prediction Unit (BPU) of HISC contains a fully-associative array, a loop-exit look-up table, of addresses of static prediction branch instructions of loop counting. When the special loop counting instruction is executed, the data referred by the Operand Descriptor 1 (OD1) is decremented by one, and BPU will put the current branch instruction address into the associative array if it detects this loop-counting instruction and that it is executing the second last pass. If BPU encounters a hit in the loop-exit look-tip table, it will predict the opposite of the static prediction scheme since this is the very last pass of the loop, and is different from the previous in-loop branches. If the addresses overflow the loop-exit look-up table capacity, the incorrect prediction will only impact the performance. If there is any entry in the array is replaced undesirably, the processor still maintains its system integrity. A loop counting instruction is:

BZ Branch via OD0 if OD1 is zero.
Decrement by 1 the data referred by OD1.

The dynamic part is done wit a two-bit branch history table in BPU. Each entry of the table contains the previous two branch actions, with each bit indicating either that branch was taken or that branch was not taken. If the preceding two branches have the same action (branch taken or not taken), then the same action is predicted. If different, then the opposite of the last action is predicted.

| $action_{i-2}$ | $action_{i-1}$ | $action_i$ (predicting). |
|---|---|---|
| Taken | Taken | Taken |
| Taken | Not taken | Taken |
| Not taken | Taken | Not taken |
| Not taken | Not taken | Not taken |

Therefore, the action predicting is the same as the second last action.

What is claimed is:

1. In a computer system, including memory for storing instructions and operands, a central processor able to fetch and decode instructions, operand descriptor indexes, operand descriptors, and an operand descriptor cache, a method for performing access control on individual operands comprising:

in the central processor, specifying the access privileges of individual operands using said operand descriptors;

wherein said specifying is performed by setting or resetting an access code in an individual operand's respective operand descriptor, independent of any paging defined by a memory or caching system; and in the central processor, validating access privileges of individual operands stored in said operand descriptor cache against a memory operation requested by a process on the operand, and if said validating fails issuing a protection violation and terminating said process.

2. The method of claim 1 further comprising:
in the operand descriptor cache, storing the access privileges of individual operands through the operand descriptors.

3. The method of claim 1 further comprising:
in the central processor, validating access privileges of a set of individual operand descriptors through a predetermined template of allowable accesses for the individual operands established when the program is initiated and loaded into the system.

4. The method of claim 1 wherein said computer system is a high-level instruction set computer system.

5. The method of claim 1 wherein said access privileges comprise read, write, and execute privileges for an individual operand.

6. The method of claim 1 wherein said access privileges can be set for supervisor mode and user mode for an individual operand.

7. In a computer system, including memory for storing instructions and operands, central processor capable of fetching and decoding instructions, operand descriptor indexes, operand descriptors, and an operand descriptor cache, a method of selecting whether to store data on individual operands into a data cache comprising:

in the central processor, processing information from an operand descriptor cache and specifying whether to store data of individual operands into a cache;

in the operand descriptor cache, storing cache options of individual operands in operand descriptors wherein said options comprise: (1) storing data in the data cache or not and (2) requiring absolute data coherency for the data in an operand or not;

in the data cache, not checking if data to be encached is shared with data in other data caches and therefore operating on the data without giving notice to other data caches or storages;

further specifying whether data coherency of cached operands is to be maintained; and further specifying an enabling of said cache, and enabling of said cache coherency.

8. The method of claim 7 further comprising:
in the data cache, performing optional bypassing of the data cache for data of individual operands.

9. The method of claim 7 further comprising:
in the data cache, checking according to the data coherency flag in the operand descriptor if data to be encached is shared with data in other data caches and if indicated by the data coherency flag, maintaining data coherency with other caches if data is modified.

10. In a computer system, a method of managing data access comprising:

providing for data storage a plurality of operand descriptors, an operand descriptor including an address and operand specific parameters;

requiring that instructions referencing data storage use one or more operand descriptors;

for an instruction accessing data storage using said operand descriptor, checking said operand specific parameters to validate said accessing; and storing operand descriptors in an operand descriptor cache;

wherein an operand descriptor parameter values are independent of any other operand descriptor parameter values;

wherein operand descriptor parameter values may be set and reset independent of any paging defined by a memory or caching system.

11. The method of claim 10 further comprising:

providing identifiers for said operand descriptors; and requiring that instructions referencing data storage use said identifiers.

12. The method of claim 10 wherein said operand specific parameters comprise:

a parameter indicating whether caching is required for an operand descriptor's data.

13. The method of claim 10 wherein said operand specific parameters comprise:

a parameter indicating whether coherency maintenance is required for an operand descriptor's data.

14. The method of claim 10 wherein said operand specific parameters comprise:

a parameter indicating whether read access is allowed for an operand descriptor's data.

15. The method of claim 10 wherein said operand specific parameters comprise:

a parameter indicating whether write access is allowed for an operand descriptor's data.

16. The method of claim 10 wherein said operand specific parameters comprise:

a parameter indicating whether execute access is allowed for an operand descriptor's data.

17. The method of claim 10 wherein said operand specific parameters comprise:

a parameter indicating whether access is allowed in user mode or supervisor mode.

18. The method of claim 10 wherein an operand descriptor's parameter values are independent of any other operand descriptor parameter's values.

19. The method of claim 10 further comprising:

validating access privileges of a set of individual operand descriptors through a pre-determined template of allowable accesses.

* * * * *

UNITED STATES PATENT AND TRADEMARK OFFICE
CERTIFICATE OF CORRECTION

| | | |
|---|---|---|
| PATENT NO. | : 6,292,879 B1 | Page 1 of 1 |
| APPLICATION NO. | : 08/736326 | |
| DATED | : September 18, 2001 | |
| INVENTOR(S) | : Fong | |

It is certified that error appears in the above-identified patent and that said Letters Patent is hereby corrected as shown below:

On the Title Page, item (54), under "Title", Lines 1-3, delete "METHOD AND APPARATUS TO SPECIFY ACCESS CONTROL LIST AND CACHE ENABLING AND CACHE COHERENCY REQUIREMENT ENABLING ON INDIVIDUAL OPERANDS OF AN INSTRUCTION OF A COMPUTER" and insert -- METHOD AND APPARATUS TO SPECIFY ACCESS CONTROL AND CACHE COHERENCY REQUIREMENT ON INDIVIDUAL OPERANDS OF AN INSTRUCTION OF A COMPUTER --.

On the Title Page, item (74), under "Attorney, Agent, or Firm", Line 2, delete "Jonanthan" and insert -- Jonathan --.

Column 1, lines 1-6, delete "METHOD AND APPARATUS TO SPECIFY ACCESS CONTROL LIST AND CACHE ENABLING AND CACHE COHERENCY REQUIREMENT ENABLING ON INDIVIDUAL OPERANDS OF AN INSTRUCTION OF A COMPUTER" and insert -- METHOD AND APPARATUS TO SPECIFY ACCESS CONTROL AND CACHE COHERENCY REQUIREMENT ON INDIVIDUAL OPERANDS OF AN INSTRUCTION OF A COMPUTER --.

Signed and Sealed this

Twenty-seventh Day of March, 2012

David J. Kappos
*Director of the United States Patent and Trademark Office*